United States Patent
Patel et al.

(10) Patent No.: US 12,413,417 B2
(45) Date of Patent: Sep. 9, 2025

(54) SYSTEM AND METHOD FOR DIGITALLY MARKING ARTIFICIAL INTELLIGENCE (AI) GENERATED CONTENT

(71) Applicant: Bank of America Corporation, Charlotte, NC (US)

(72) Inventors: Vinesh Premji Patel, Greenwich (GB); Michael R Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 112 days.

(21) Appl. No.: 18/521,792

(22) Filed: Nov. 28, 2023

(65) Prior Publication Data
US 2025/0175345 A1   May 29, 2025

(51) Int. Cl.
*H04L 9/32* (2006.01)
*G06N 20/00* (2019.01)

(52) U.S. Cl.
CPC ........... *H04L 9/3247* (2013.01); *G06N 20/00* (2019.01)

(58) Field of Classification Search
CPC .............................. G06N 20/00; H04L 9/3247
See application file for complete search history.

(56) References Cited

U.S. PATENT DOCUMENTS

| | | |
|---|---|---|
| 10,950,020 B2 | 3/2021 | Du |
| 11,263,384 B2 | 3/2022 | Nelson et al. |
| 11,307,894 B1 | 4/2022 | Jibaja et al. |
| 11,392,754 B2 | 7/2022 | Nelson et al. |
| 11,403,290 B1 | 8/2022 | Gold et al. |
| 11,563,560 B2 | 1/2023 | Zou |
| 11,710,136 B2 | 7/2023 | Williams et al. |
| 11,720,741 B2 | 8/2023 | Nelson et al. |
| 11,748,555 B2 | 9/2023 | Tran |
| 11,768,636 B2 | 9/2023 | Gold et al. |
| 11,775,494 B2 | 10/2023 | Urdiales et al. |
| 12,125,119 B1 * | 10/2024 | Liu ...................... G06T 1/0078 |
| 2020/0050894 A1 | 2/2020 | Park |
| 2020/0403818 A1 | 12/2020 | Daredia et al. |
| 2021/0064792 A1 | 3/2021 | Kim et al. |
| 2021/0319240 A1 * | 10/2021 | Demir ..................... G06V 40/40 |
| 2022/0253443 A1 | 8/2022 | Gold et al. |
| 2023/0038922 A1 | 2/2023 | Fauvel et al. |
| 2023/0205985 A1 | 6/2023 | Zhu et al. |
| 2023/0230320 A1 | 7/2023 | Cho et al. |
| 2023/0252224 A1 | 8/2023 | Tran |
| 2023/0351102 A1 | 11/2023 | Tran |
| 2024/0378801 A1 * | 11/2024 | Rivas Vetencourt ... G06F 21/16 |

FOREIGN PATENT DOCUMENTS

| | | | |
|---|---|---|---|
| JP | 2025045703 A | * | 4/2025 |
| JP | 2025045749 A | * | 4/2025 |

* cited by examiner

*Primary Examiner* — Jonathan A Bui

(57) ABSTRACT

A processor receives request to generate content using an AI tool and generates the requested content using the AI tool. The processor detects that the AI tool used a first AI module and a second AI module associated with the AI tool to generate the requested content. In response, the processor accesses, from a memory, a first digital signature associated with the first AI module and a second digital signature associated with the second AI module. The processor generates a combined digital signature based on the first digital signature and the second digital signature and embeds the combined digital signature in the generated content to generate a marked content.

20 Claims, 2 Drawing Sheets

SYSTEM AND METHOD FOR DIGITALLY MARKING ARTIFICIAL INTELLIGENCE (AI) GENERATED CONTENT

TECHNICAL FIELD

The present disclosure relates generally to data processing, and more specifically to a system and method for digitally marking artificial intelligence (AI) generated content.

BACKGROUND

As the technology behind Artificial Intelligence (AI) continues to advance, so does the potential of its misuse. Generative AI is a subset of AI that creates new data or content such as images, audio files, digital art, and software code based on user prompts. This form of AI is already being used to generate fake and plagiarized content. For example, generative AI technology has been used to create deepfakes to spread disinformation. Further fake news and plagiarized digital art has also been created and spread across social media platforms. This has led to serious concerns about the authenticity of digital content and its impact on the public at large. With AI technology being constantly refined, these problems will only get worse with time.

SUMMARY

The system and method implemented by the system as disclosed in the present disclosure provide technical solutions to the technical problems discussed above by identifying digital content generating using AI technology.

For example, the disclosed system and methods provide the practical application of intelligently identifying a source of a digital content generated using AI technology. As described in further detail below, these techniques include digitally marking AI generated content to identify a source of the content. Digitally marking AI generated content includes intelligently adding a digital signature to the AI generated content, wherein the digital signature may be used to verify a known source of the content or to identify an unknown source of the content. Additionally, the disclosed techniques may be used to determine whether a piece of digital content was generated using an AI tool. In other words, the disclosed techniques may be used to determine whether a piece of digital content was generated using AI technology.

As described in embodiments of the present disclosure, an AI tool may be configured to digitally mark AI content generated by the AI tool. In this context, the AI tool may store a primary digital signature associated with the AI tool that is unique to the AI tool. The primary digital signature may include and/or indicate information that identifies a source associated with the AI content. AI tool may be configured to embed the primary digital signature in the AI content. When the primary digital signature is decoded by a software application configured to consume digital content, the information decoded from the primary digital signature may allow an identification of the source of the AI content. For example, the information decoded from the primary digital signature may include a unique identity of the AI tool used to generate the AI content. This allows a determination that the particular piece of digital content was generated using AI technology (e.g., using an AI tool). Additionally, the information allows an identification of the particular AI tool used to generate the AI content. In an additional or alternative embodiment, the information decoded from the primary digital signature may include a unique identity of the computing node that generated the AI content and/or an identity of the owner of the AI content. The identification of these aspects associated with a piece of digital content avoids and/or prevents deep fakes, plagiarism, and fake information and thus improves data security on the internet.

The disclosed system and methods provide the practical application of identifying AI modules used to generate an AI content. As described in embodiments of the present disclosure, the AI tool generates a combined digital signature including individual module signatures associated with each AI module used to generate the AI content. Inclusion of the module signatures allows identification of the particular AI modules that are used to generate AI content. This information may be used to re-train and refine the AI tool and improve generation of AI content. For example, a decoding algorithm running at a computing node may decode the combined digital signature embedded in the AI content, extract the individual module signatures, and identify the AI modules that were used by the AI tool to generate the AI content. This data may then be fed as training data to the AI tool to refine generation AI content. Improving generation of AI content improves the efficiency of the AI tool and the computing node running the AI tool.

Thus, the disclosed system and method generally improves Artificial Intelligence technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
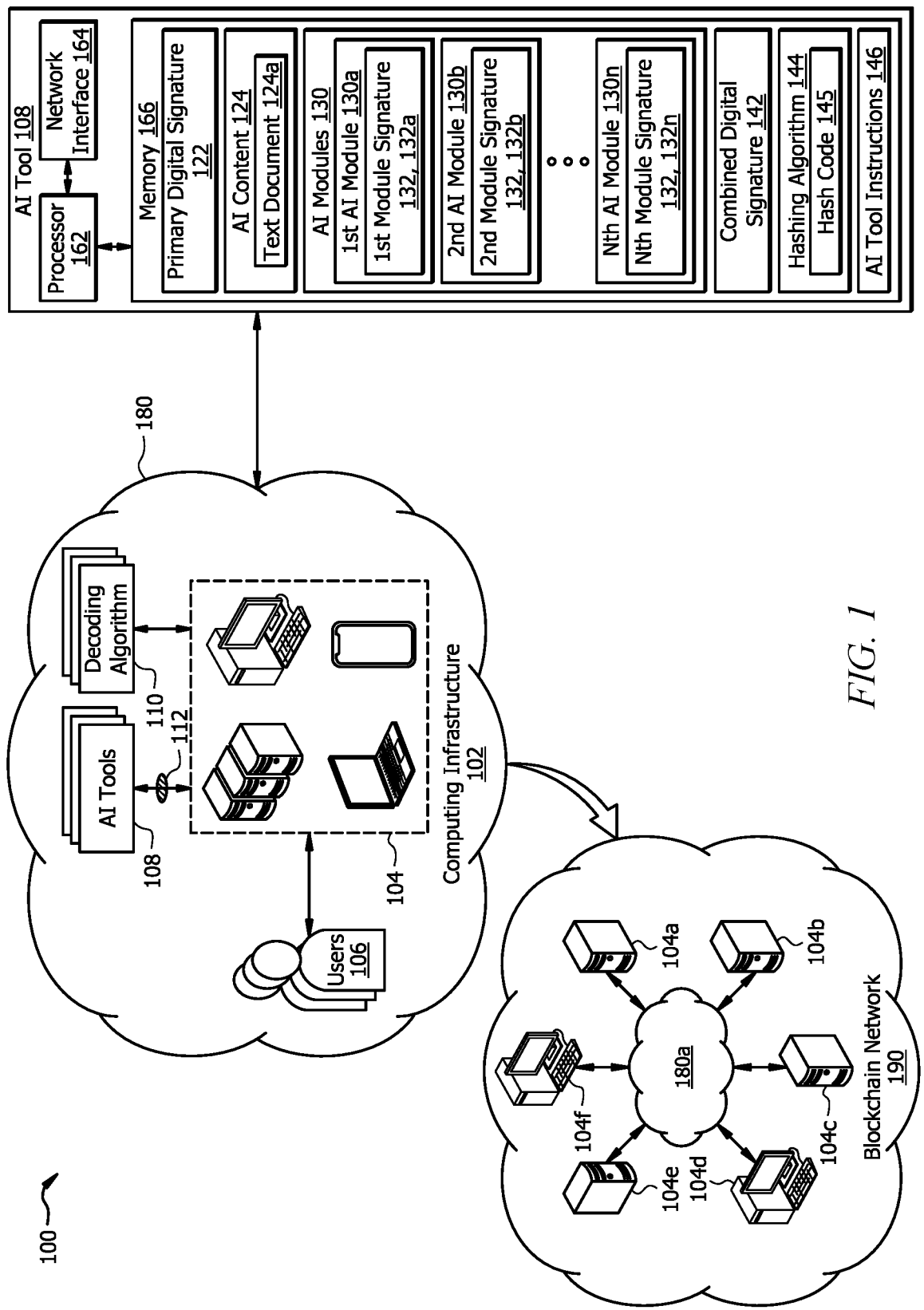
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 180. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 180. Software components may include software applications that are run by one or more of the computing nodes 104 including, but not limited to, operating systems, user interface applications, third party software, database management software, service management software, mainframe software, metaverse software, AI tools (e.g., AI tool 108) and other customized software programs implementing particular functionalities. For example, software code relating to one or more software applications may be stored in a memory device and one or more processors (e.g., belonging to one or more computing nodes 104) may execute the software code to implement respective functionalities. For example, software applications run by one or more computing nodes 104 of the computing infrastructure 102 may include Artificial Intelligence (AI) tools 108 and decoding algorithms 110. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., AI tool 108) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 may include a blockchain network 190. For example, a portion of the computing nodes 104 may form the blockchain network 190. As shown in FIG. 1, example blockchain network 190 includes computing nodes 104a, 104b, 104c, 104d, 104e and 104f connected to each other via a portion of the network 180 (shown as 180a). The blockchain network 190 implements distributed computing which generally refers to a method of making multiple computers (e.g., computing nodes 104a-104f) work together to solve a common problem. This makes a computer network (e.g., blockchain network 190) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes.

Embodiments of the present disclosure describe techniques for intelligently identifying a source of a digital content generated using AI technology. As described in further detail below, these techniques include digitally marking AI generated content to identify a source of the content. Digitally marking AI generated content includes intelligently adding a digital signature to the AI generated content, wherein the digital signature may be used to verify a known source of the content or to identify an unknown source of the content. Additionally, the disclosed techniques may be used to determine whether a piece of digital content was generated using an AI tool 108. In other words, the disclosed techniques may be used to determine whether a piece of digital content was generated using AI technology.

At least a portion of the computing infrastructure 102 (e.g., one or more computing nodes 104) may implement an AI tool 108 which may perform a plurality of operations associated with generating and digitally marking AI content 124. The AI tool comprises a processor 162, a memory 166, and a network interface 164. The AI tool 108 may be configured as shown in FIG. 1 or in any other suitable configuration.

The processor 162 comprises one or more processors operably coupled to the memory 166. The processor 162 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 162 may be a programmable logic device, a microcontroller, a microprocessor, or any suitable combination of the preceding. The processor 162 is communicatively coupled to and in signal communication with the memory 166. The one or more processors are configured to process data and may be implemented in hardware or software. For example, the processor 162 may be 8-bit, 16-bit, 32-bit, 64-bit or of any other suitable architecture. The processor 162 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., AI tool instructions 146) to implement the AI tool 108. In this way, processor 162 may be a special-purpose computer designed to implement the functions disclosed herein. In one or more embodiments, the AI tool 108 is implemented using logic units, FPGAs, ASICs, DSPs, or any other suitable hardware. The AI tool 108 is configured to operate as described with reference to FIG. 2. For example, the processor 162 may be configured to perform at least a portion of the method 200 as described in FIG. 2.

The memory 166 comprises a non-transitory computer-readable medium such as one or more disks, tape drives, or solid-state drives, and may be used as an over-flow data storage device, to store programs when such programs are selected for execution, and to store instructions and data that are read during program execution. The memory 166 may be volatile or non-volatile and may comprise a read-only memory (ROM), random-access memory (RAM), ternary content-addressable memory (TCAM), dynamic random-access memory (DRAM), and static random-access memory (SRAM).

The memory 166 is operable to store primary digital signature 122, AI content 124, AI modules 130, combined digital signature 142, hashing algorithm 144, and the AI tool instructions 146. The AI tool instructions 146 may include any suitable set of instructions, logic, rules, or code operable to execute the AI tool 108.

The network interface 164 is configured to enable wired and/or wireless communications. The network interface 164 is configured to communicate data between the AI tool 108 and other devices, systems, or domains (e.g., computing nodes 104). For example, the network interface 164 may comprise a Wi-Fi interface, a LAN interface, a WAN interface, a modem, a switch, or a router. The processor 162 is configured to send and receive data using the network interface 164. The network interface 164 may be configured to use any suitable type of communication protocol as would be appreciated by one of ordinary skill in the art.

It may be noted that each of the computing nodes 104 may be implemented like the AI tool 108 shown in FIG. 1. For example, each of the computing nodes 104 may have a respective processor and a memory that stores data and instructions to perform a respective functionality of the computing node 104.

AI tool 108 may be configured to generate digital content (e.g., AI content 124) using AI technology (e.g., machine learning) based on user prompts (e.g., prompts made by a user 106) or machine generated prompts. Example, prompts made to the AI tool 108 may include, but are not limited to, a text prompt and a voice prompt. The user prompts and machine generated prompts are collectively shown in FIG. 1 as request 112. Upon receiving a request 112 (e.g., a text prompt), the AI tool 108 may be configured to generate AI content 124 that may include but is not limited to, pictures, text (e.g., text document 124*a* and/or software code), audio clips, and video clips. For example, a user 106 may enter a text prompt on a user interface provided by the AI tool 108, wherein the user prompt may ask the AI tool 108 to generate a picture of a lion walking in a rainforest. The AI tool 108 may generate a computer-generated digital picture in response to receiving the text prompt.

In certain embodiments, AI tool 108 may include a plurality of AI modules 130 (shown as including first AI module 130*a*, second AI module 130*b*, . . . Nth AI module 130*n*), wherein each AI module 130 is configured (e.g., trained) to generate a particular type of AI content 124 or a portion thereof. In other words, each AI module 130 is trained to generate a particular type of AI content 124 including, but not limited to, pictures, text, audio, video, graphs, or tables. For example, the first AI module 130*a* may be trained to generate pictures, and the second AI module 130*b* may be trained to generate text. Similarly, other AI modules 130 of the AI tool 108 may be trained to generate audio, video, graphs, and tables. The AI tool 108 may use multiple AI modules 130 to generate a requested AI content 124. For example, when a user 106 prompts the AI tool 108 to generate a scientific report based on provided input data, the AI tool 108 may use a first AI module to generate text, a second AI module to generate pictures, a third AI module to generate tables, and a fourth AI module to generate graphs/plots. The AI tool 108 may then put together the individual portions generated by the individual module to generate the requested report.

AI tool 108 may be configured to digitally mark AI content 124 generated by the AI tool 108. In this context, AI tool 108 may store a primary digital signature 122 associated with the AI tool 108 and that is unique to the AI tool 108. The primary digital signature 122 may include and/or indicate information that identifies a source associated with the AI content 124. For example, the primary digital signature 122 may include one or more of a unique identity of the AI tool 108 (e.g., tool name, version etc.), an identity of the computing node 104 that was used to generate the AI content 124, or identity of an owner of the AI content 124 (e.g., copyright information). It may be noted that this is not an exhaustive list and that the primary digital signature 122 may include or indicate a multitude of other information as may be envisaged by a personal of ordinary skill in the art.

AI tool 108 may be configured to embed the primary digital signature 122 in the AI content 124. Embedding the primary digital signature 122 in the AI content 124 may include one or more of adding a digital watermark including the primary digital signature 122 to the AI content 124, adding a digital fingerprint including the primary digital signature 122 to the AI content 124, or adding a steganographic code including the primary digital signature 122 to the AI content 124. A person having ordinary skill in the art may appreciate that other known methods for embedding data into digital content may be used to embed the primary digital signature 122 into the AI content 124. Once digitally marked, the marked AI content 124 may be transmitted to any other computing node 104 of the computing infrastructure 102.

One or more computing nodes 104 of the computing infrastructure 102 may be configured to open and review the AI content 124. For example, a software application may be installed at a particular computing node 104 that is configured to open and review the AI content 124. Depending on the nature of the AI content 124 (e.g., text, pictures, audio, video etc.), the software application may be a digital media player, a text editor, word processor, a pdf reader and/or a multi-media player. The software application may include a decoding algorithm 110 that is configured to decode digital signatures (e.g., primary digital signature 122). For example, the decoding algorithm 110 may be included as a plug-in software to the software application that is to be used to review the AI content 124. The decoding algorithm 110 may be configured to automatically run when any content is opened by the software application including AI content 124. For example, in response to receiving a command to open the marked AI content 124, the software application may open the AI content 124. This may automatically trigger the decoding algorithm 110 to extract and decode the digital signature embedded in the AI content 124. For example, when a digital signature (e.g., primary digital signature 122) is included (e.g., embedded) in a piece of digital content (e.g., AI content 124) being opened by a software application, the decoding algorithm 110 automatically detects and decodes the digital signature to extract information included in the digital signature. For example, the decoding algorithm 110 is configured to detect and decode the primary digital signature 122 that is embedded in the digitally marked AI content 124. Based on decoding the primary digital signature 122, the decoding algorithm 110 extracts the information included in the primary digital signature 122.

The information decoded from the primary digital signature 122 may allow an identification of the source of the AI content 124. For example, the information decoded from the primary digital signature 122 may include a unique identity of the AI tool used to generate the AI content 124. This allows a determination that the particular piece of digital content (e.g., AI content 124) was generated using AI technology (e.g., using an AI tool 108). Additionally, the information allows an identification of the particular AI tool 108 used to generate the AI content 124. In an additional or alternative embodiment, the information decoded from the primary digital signature 122 may include a unique identity of the computing node 104 that generated the AI content 124 and/or an identity of the owner of the AI content 124. The identification of these aspects associated with a piece of digital content avoids and/or prevents deep fakes, plagiarism, and fake information.

In certain embodiments, the primary digital signature 122 is changed from time to time (e.g., periodically or based on a pre-configured schedule) to prevent bad actors from acquiring the primary digital signature 122, for example, by reverse engineering AI content 124 generated by the AI tool 108 and using it to generate fake AI content 124.

In one or more embodiments, the AI tool 108 may store a module signature 132 associated with each AI module 130, wherein each module signature 132 is a digital signature that uniquely identifies a particular AI module 130. For example, a module signature 132 associated with a particular AI module 130 includes a unique identifier (e.g., module name, version etc.) of the AI module 130. As shown in FIG. 1, the first AI module 130*a* is associated with a first module signature 132*a*, the second AI module 130*b* is associated with a second module signature 132*b*, and the Nth AI module 130*n* is associated with Nth module signature 132*n*. AI tool 108 may be configured to embed in the AI content 124, the module signature 132 of each AI module 130 that is used to generate the AI content 124. In one embodiment, AI tool 108 generates a combined digital signature 142 based on the module signatures 132 associated with AI modules 130 used to generate the AI content 124 and embeds the combined digital signature 142 in the AI content 124. For example, when the first AI module 130*a* and the second AI module 130*b* are used to generate the AI content 124, AI tool 108 generates a combined digital signature 142 based on the first module signature 132*a* and the second module signature 132*b*. In one embodiment, the combined digital signature 142 includes the module signatures 132 associated with the AI modules 130 used to generate the AI content 124. Inclusion of the module signatures 132 allows identification of the particular AI modules 130 that are used to generate AI content 124 based on a particular prompt (e.g., text prompt). This information may be used to re-train and refine the AI tool 108 and improve generation of AI content 124. For example, a decoding algorithm 110 running at a computing node 104 may decode the combined digital signature 142 embedded in the AI content 124, extract the individual module signatures 132, and identify the AI modules 130 that were used by the AI tool 108 to generate the AI content 124. This data may then be fed as training data to the AI tool 108 to refine generation AI content 124. In an additional or alternative embodiment, the inclusion of the module signatures 132 in the AI content 124 indicates that the AI content 124 was generated using AI technology (e.g., using an AI tool 108).

In certain embodiments, the primary digital signature 122 may include a hash code 145 that is uniquely generated for a particular AI content 124. For example, AI tool 108 may be configured to store and deploy a hashing algorithm 144 that generates a hashing code 145 based on pre-selected portions of a text document generated by the AI tool 108. For example, the hashing algorithm 144 may be configured to generate a hash code 145 based on text at line 3 between spaces 2 and 5, line 8 between spaces 1 and 6, line 12 between spaces 4 and 11 etc. When a text document (e.g., software code) is generated using the AI tool 108, the AI tool 108 generates a hash code 145 based on the hashing algorithm 144 and embeds the hash code 145 in the text document. Since every text document will have different text at the pre-selected portions, the same hashing algorithm 144 generates a unique hash code 145 for each text document, making it very difficult for a bad actor to identify the hashing algorithm 144 by reverse-engineering hash codes 145 embedded in text documents generated by the AI tool 108. One example of a hashing algorithm 144 is a Secure Hashing Algorithm (SHA) that is generally used for hashing data.

A software application (e.g., software code editor) that can be used to open and review text documents such as software code may include a software plug-in configured with the same hashing algorithm 144. For example, a decoding algorithm 110 running at a computing node 104 may include the same hashing algorithm 144 that is used by the AI tool 108 to generate hash codes 145. When the software application is used to open the text document, the decoding algorithm 110 reads the hash code 145 embedded in the text document and verifies the hash code 145 based on the text document. For example, the decoding algorithm 110 generates a second hash code based on the same hashing algorithm used by the AI tool 108 and compares the generated second hash code with the hash code 145 embedded in the text document. When the generated second hash code matches with the hash code 145 embedded in the text document, the decoding algorithm 110 determines that the hash code 145 has been verified and identifies the text document as generated by the particular AI tool 108.

The AI tool 108 may be configured to periodically change the hashing algorithm 144 that is used to generate the hashing code 145. This avoids a potential attacker/hacker from identifying the hashing algorithm by reverse engineering the hash codes 145 embedded in text documents generated by the AI tool 108. For example, from time to time, the AI tool 108 may change the pre-selected portions (e.g., lines, word positions etc.) from AI generated text documents that is to be used to generate the hash code 145. Each time the hashing algorithm 144 is changed by the AI tool 108, the changed hashing algorithm 144 is transmitted to software applications that are configured to consume the AI content 124 generated by the AI tool 108, so that the hash codes 145 can be verified using the latest hashing algorithm 144. In some embodiments, the AI tool 108 may include (e.g., as part of the primary digital signature 122) a date on which a particular piece of AI content 124 was generated. This allows a decoding algorithm 110 at the receiving end to use the correct hashing algorithm 144 that was used by the AI tool 108 to generate the AI content 124, for verifying the AI content 124. For example, a computing node 104 that runs a software application configured to consume AI content 124 may store several hashing algorithms 144 and the dates (e.g., date ranges) each hashing algorithm 144 was used by the AI tool 108 to generate hash codes 145. Upon receiving a particular piece of AI content 124 (e.g., text document) the decoding algorithm 110 decodes the primary digital signature 122 and reads the hash code 145 along with the particular date on which the AI content 124 was generated. Then the decoding algorithm 110 looks up the hashing algorithm 144 that was used on that particular date and uses the hashing algorithm 144 to verify the received hash code 145.

In some cases, a bad actor may modify the text of a text document generated by the AI tool 108 in a non-substantive manner to avoid identification as being generated by the AI tool 108. For example, when the text in a text document generated by the AI tool 108 is modified after the hash code 145 has been embedded in the text document, a second hash code generated by the decoding algorithm 110 of a consuming software application based on the modified text document may not match with the hash code 145 embedded in the text document. In this context, a software application configured to consume the AI content 124 generated by the AI tool 108 may be configured to perform an entropy analysis of the hash code 145 embedded in the text document and generate a similarity value that indicates how similar a second hash code generated at the receiving end is to the hash code 145 embedded in the text document, by comparing the second hash code generated at the receiving end to the hash code 145 embedded in the text document. When a similarity value is above a pre-configured threshold (e.g., 85%), it is determined that the text document was generated by the AI tool 108 and modified later. Thus, the entropy analysis allows identification of text documents generated by the AI tool 108 even when the text documents were modified from their original generated form. This avoids plagiarizing of AI content 124 generated by the AI tool 108 by bad actors by modifying the original AI content 124.

In certain embodiments, the AI content 124 generated by the AI tool 108 may be stored in the blockchain network 190. Since data stored in a blockchain network 190 is generally immutable, this provides an additional layer of data security and avoids bad actors from faking or modifying AI generated content 124.

Figure 2:
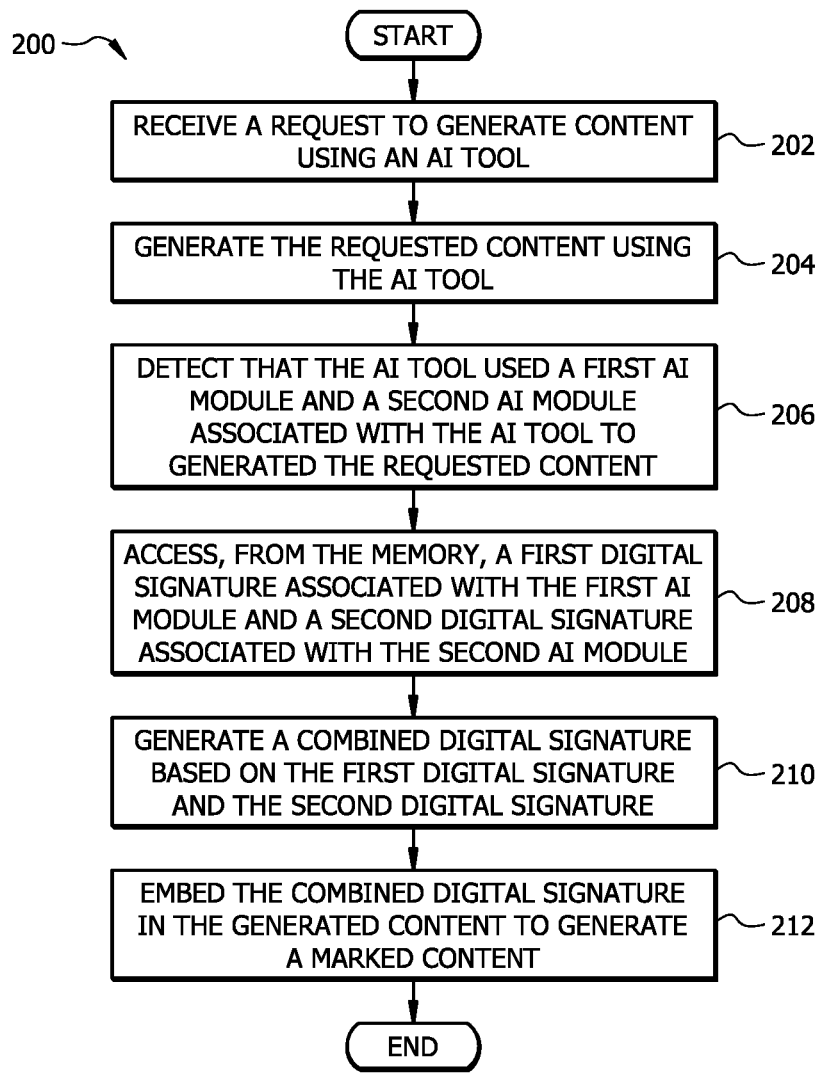
FIG. 2 illustrates a flowchart of an example method for digitally marking AI content, in accordance with one or more embodiments of the present disclosure.

FIG. 2 illustrates a flowchart of an example method 200 for digitally marking AI content 124, in accordance with one or more embodiments of the present disclosure. Method 200 may be performed by the AI tool 108 shown in FIG. 1.

At operation 202, AI tool 108 receives a request to generate AI content 124.

At operation 204, the AI tool 108 generates the requested AI content 124.

As described above, AI tool 108 may be configured to generate digital content (e.g., AI content 124) using AI technology (e.g., machine learning) based on user prompts (e.g., prompts made by a user 106) or machine generated prompts. Example, prompts made to the AI tool 108 may include, but are not limited to, a text prompts and a voice prompts. The user prompts and machine generated prompts are collectively shown in FIG. 1 as request 112. Upon receiving a request 112 (e.g., a text prompt), the AI tool 108 may be configured to generate AI content 124 that may include but is not limited to, pictures, text (e.g., text document 124a and/or software code), audio clips, and video clips. For example, a user 106 may enter a text prompt on a user interface provided by the AI tool 108, wherein the user prompt may ask the AI tool 108 to generate a picture of a lion walking in a rainforest. The AI tool 108 may generate a computer-generated digital picture in response to receiving the text prompt.

At operation 208, the AI tool 108 detects that a first AI module 130a and a second AI module 130b associated with the AI tool 108 were used to generate the requested AI content 124.

In certain embodiments, AI tool 108 may include a plurality of AI modules 130 (shown as including first AI module 130a, second AI module 130b, . . . Nth AI module 130n), wherein each AI module 130 is configured (e.g., trained) to generate a particular type of AI content 124 or a portion thereof. In other words, each AI module 130 is trained to generate a particular type of AI content including, but is not limited to, pictures, text, audio, video, graphs, or tables. For example, the first AI module 130a may be trained to generate pictures, and the second AI module 130b may be trained to generate text. Similarly, other AI modules of the AI tool 108 may be trained to generate audio, video, graphs, and tables. The AI tool 108 may use multiple AI modules 130 to generate a requested AI content 124. For example, when a user 106 prompts the AI tool 108 to generate a scientific report based on provided input data, the AI tool 108 may use a first AI module to generate text, a second AI module to generate pictures, a third AI module to generate tables, and a fourth AI module to generate graphs/plots. The AI tool 108 may then put together the individual portions generated by the individual module to generate the requested report.

At operation 208, AI tool 108 accesses, from the memory 166 a first digital signature (e.g., first module signature 132a) associated with the first AI module 130a and a second digital signature (e.g., second module signature 132b) associated with the second AI module 130b.

At operation 210, AI tool 108 generates a combined digital signature 142 based on the first digital signature (e.g., first module signature 132a) and the second digital signature (e.g., second module signature 132b).

At operation 212, AI tool 108 embeds the combined digital signature 142 in the generated AI content 124 to generated a marked AI content.

As described above, the AI tool 108 may store a module signature 132 associated with each AI module 130, wherein each module signature 132 is a digital signature that uniquely identifies a particular AI module 130. For example, a module signature 132 associated with a particular AI module 130 includes a unique identifier (e.g., module name, version etc.) of the AI module 130. As shown in FIG. 1, the first AI module 130a is associated with a first module signature 132a, the second AI module 130b is associated with a second module signature 132b, and the Nth AI module 130n is associated with Nth module signature 132n. AI tool 108 may be configured to embed in the AI content 124, the module signature 132 of each AI module 130 that is used to generate the AI content 124. In one embodiment, AI tool 108 generates a combined digital signature 142 based on the module signatures 132 associated with AI modules 130 used to generate the AI content 124 and embeds the combined digital signature 142 in the AI content 124. For example, when the first AI module 130a and the second AI module 130b are used to generate the AI content 124, AI tool 108 generates a combined digital signature 142 based on the first module signature 132a and the second module signature 132b. In one embodiment, the combined digital signature 142 includes the module signatures 132 associated with the AI modules 130 used to generate the AI content 124. Inclusion of the module signatures 132 allows identification of the particular AI modules 130 that are used to generate AI content 124 based on a particular prompt (e.g., text prompt). This information may be used to re-train and refine the AI tool 108 and improve generation of AI content 124. For example, a decoding algorithm 110 running at a computing node 104 may decode the combined digital signature 142 embedded in the AI content 124, extract the individual module signatures 132, and identify the AI modules 130 that were used by the AI tool 108 to generate the AI content 124. This data may then be fed as training data to the AI tool 108 to refine generation AI content 124. In one embodiment, the inclusion of the module signatures 132 in the AI content 124 indicates that the AI content 124 was generated using AI technology (e.g., using an AI tool 108).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory storing at least one digital signature associated with an Artificial Intelligence (AI) tool; and
a processor communicatively coupled to the memory and configured to:
receive a request to generate content using the AI tool, wherein the content comprises one or more of a picture, an audio clip, a video clip, a text document or software code;
generate the requested content using the AI tool, wherein:
the AI tool comprises a plurality of AI modules;
each AI module is configured to generate a particular type of content; and
each AI module is associated with a unique digital signature that uniquely identifies the AI module;
detect that the AI tool used a first AI module and a second AI module associated with the AI tool to generate the requested content;
access, from the memory, a first digital signature associated with the first AI module and a second digital signature associated with the second AI module;
generate a combined digital signature based on the first digital signature and the second digital signature; and
embed the combined digital signature in the generated content to generate a marked content.

2. The system of claim 1, wherein the processor is further configured to:
access, from the memory, a primary digital signature associated with the AI tool, wherein the primary digital signature uniquely identifies the AI tool; and
embed the primary digital signature in the marked content.

3. The system of claim 2, wherein the primary digital signature comprises or indicates information relating to one or more of an owner of the marked content and an identity of the AI tool.

4. The system of claim 1, wherein a digital signature associated with a particular AI module comprises or indicates an identity of the AI module.

5. The system of claim 1, wherein the processor is configured to embed the combined digital signature in the generated content by:
one or more of adding a digital watermark to the content, adding a digital fingerprint to the content, or adding a steganographic code to the content.

6. The system of claim 1, further comprising a second processor configured to:
receive a command to open the marked content;
in response to receiving the command, extract the combined digital signature from the marked content;
decode the combined digital signature to extract the first digital signature and the second digital signature; and
based on decoding the combined digital signature:
determine that the content was generated using an AI tool; and
identify based on the first digital signature and the second digital signature that the AI tool used the first AI module and the second AI module to generate the marked content.

7. The system of claim 1, further comprising a blockchain network, wherein the processor is further configured to store the marked content as a data interaction in a blockchain network.

8. The system of claim 1, wherein:
the requested content is a text document;
the memory is further configured to store a coding algorithm for generating hash codes based on text documents generated by the AI tool, wherein the coding algorithm is unique to the AI tool;
the processor is further configured to:
access the coding algorithm from the memory, wherein the coding algorithm is configured to generate a hash code based on pre-configured portions of the text document;
generate the hash code based on the pre-configured portions of the text document using the coding algorithm; and
embed the hash code in the text document to generate a marked text document.

9. The system of claim 8, wherein the processor is further configured to modify the coding algorithm according to a pre-configured schedule.

10. A method for digitally marking AI content, comprising:
receiving a request to generate content using an Artificial Intelligence (AI) tool, wherein the content comprises one or more of a picture, an audio clip, a video clip, a text document or software code;
generating the requested content using the AI tool, wherein:
the AI tool comprises a plurality of AI modules;
each AI module is configured to generate a particular type of content; and
each AI module is associated with a unique digital signature that uniquely identifies the AI module;
detecting that the AI tool used a first AI module and a second AI module associated with the AI tool to generate the requested content;
accessing, from a memory, a first digital signature associated with the first AI module and a second digital signature associated with the second AI module;
generating a combined digital signature based on the first digital signature and the second digital signature; and
embedding the combined digital signature in the generated content to generate a marked content.

11. The method of claim 10, further comprising:
accessing, from the memory, a primary digital signature associated with the AI tool, wherein the primary digital signature uniquely identifies the AI tool; and embedding the primary digital signature in the marked content.

12. The method of claim 11, wherein the primary digital signature comprises or indicates information relating to one or more of an owner of the marked content and an identity of the AI tool.

13. The method of claim 10, wherein a digital signature associated with a particular AI module comprises or indicates an identity of the AI module.

14. The method of claim 10, wherein embedding the combined digital signature in the generated content comprises one or more of adding a digital watermark to the content, adding a digital fingerprint to the content, or adding a steganographic code to the content.

15. The method of claim 10, further comprising:
receive a command to open the marked content;
in response to receiving the command, extract the combined digital signature from the marked content;
decode the combined digital signature to extract the first digital signature and the second digital signature; and
based on decoding the combined digital signature:
determine that the content was generated using an AI tool; and
identify based on the first digital signature and the second digital signature that the AI tool used the first AI module and the second AI module to generate the marked content.

16. A non-transitory computer-readable medium storing instructions that when executed by a processor cause the processor to:
receive a request to generate content using an Artificial Intelligence (AI) tool, wherein the content comprises one or more of a picture, an audio clip, a video clip, a text document or software code;
generate the requested content using the AI tool, wherein:
the AI tool comprises a plurality of AI modules;
each AI module is configured to generate a particular type of content; and
each AI module is associated with a unique digital signature that uniquely identifies the AI module;
detect that the AI tool used a first AI module and a second AI module associated with the AI tool to generate the requested content;
access, from a memory, a first digital signature associated with the first AI module and a second digital signature associated with the second AI module;
generate a combined digital signature based on the first digital signature and the second digital signature; and
embed the combined digital signature in the generated content to generate a marked content.

17. The non-transitory computer-readable medium of claim 16, wherein the instructions further cause the processor to:
access, from the memory, a primary digital signature associated with the AI tool, wherein the primary digital signature uniquely identifies the AI tool; and
embed the primary digital signature in the marked content.

18. The non-transitory computer-readable medium of claim 17, wherein the primary digital signature comprises or indicates information relating to one or more of an owner of the marked content and an identity of the AI tool.

19. The non-transitory computer-readable medium of claim 16, wherein a digital signature associated with a particular AI module comprises or indicates an identity of the AI module.

20. The non-transitory computer-readable medium of claim 16, wherein embedding the combined digital signature in the generated content comprises one or more of adding a digital watermark to the content, adding a digital fingerprint to the content, or adding a steganographic code to the content.

* * * * *